United States Patent
Followill et al.

(10) Patent No.: US 9,457,522 B2
(45) Date of Patent: Oct. 4, 2016

(54) METHODS AND APPARATUS USEFUL IN MANUFACTURING LENSES

(71) Applicant: CooperVision International Holding Company, LP, St. Michael (BB)

(72) Inventors: John G. Followill, Livermore, CA (US); Ryszard Radwanski, Livermore, CA (US); David Chiang, Pleasanton, CA (US)

(73) Assignee: COOPERVISION INTERNATIONAL HOLDING COMPANY, LP, St. Michael (BB)

( * ) Notice: Subject to any disclaimer, the term of this patent is extended or adjusted under 35 U.S.C. 154(b) by 375 days.

(21) Appl. No.: 14/187,818

(22) Filed: Feb. 24, 2014

(65) Prior Publication Data
US 2014/0312516 A1 Oct. 23, 2014

Related U.S. Application Data

(60) Provisional application No. 61/769,462, filed on Feb. 26, 2013.

(51) Int. Cl.
 *B29D 11/00* (2006.01)
 *B23B 31/117* (2006.01)

(52) U.S. Cl.
 CPC ....... *B29D 11/00038* (2013.01); *B23B 31/117* (2013.01); *B29D 11/00192* (2013.01); *B23B 2260/004* (2013.01)

(58) Field of Classification Search
 CPC .................. B29D 11/00038; B29D 11/00192; B23B 31/117; B23B 2260/004
 See application file for complete search history.

(56) References Cited

U.S. PATENT DOCUMENTS

| | | |
|---|---|---|
| 2,528,873 A | 11/1950 | Dorman |
| 4,647,261 A | 3/1987 | Schaffner |
| 7,319,133 B2 | 1/2008 | Brame et al. |
| 7,320,587 B2 | 1/2008 | Goodenough et al. |
| 7,360,890 B2 | 4/2008 | Back |
| 7,426,993 B2 | 9/2008 | Coldrey et al. |
| 7,750,079 B2 | 7/2010 | Almond et al. |
| 7,780,881 B2 | 8/2010 | Goodenough et al. |
| 7,785,092 B2 | 8/2010 | Rogers |
| 7,799,248 B2 | 9/2010 | Francis |
| 7,799,249 B2 | 9/2010 | Goodenough et al. |
| 7,811,483 B2 | 10/2010 | Witko |
| 7,811,503 B2 | 10/2010 | Daulton |
| 7,897,071 B2 | 3/2011 | Goodenough et al. |
| 8,197,724 B2 | 6/2012 | Witko |
| 8,231,218 B2 | 7/2012 | Hong et al. |
| 8,298,458 B2 | 10/2012 | Rogers |
| 2007/0035049 A1 | 2/2007 | Bruce et al. |
| 2007/0278705 A1* | 12/2007 | Witko ............. B29D 11/00192 264/2.6 |

FOREIGN PATENT DOCUMENTS

| | | |
|---|---|---|
| DE | 3637891 A1 | 3/1988 |
| WO | 2007021596 A1 | 2/2007 |
| WO | 2008074541 A1 | 6/2008 |

* cited by examiner

*Primary Examiner* — Mathieu Vargot
(74) *Attorney, Agent, or Firm* — Stout, Uxa & Buyan, LLP; Frank J. Uxa

(57) ABSTRACT

Methods of manufacturing a contact lens are provided. Such methods include using an adjustable mandrel to fixedly retain a single mold section carrying a polymerized contact lens product and delensing the contact lens product from the single mold section. Adjustable mandrels are also provided.

16 Claims, 2 Drawing Sheets

METHODS AND APPARATUS USEFUL IN MANUFACTURING LENSES

The present application claims the benefit of U.S. Provisional Application Ser. No. 61/769,462, filed Feb. 26, 2013, the disclosures of which is incorporated in its entirety herein by reference.

The present disclosure relates to the manufacture of lenses, such as molded lenses. More particularly, the present disclosure relates to methods of manufacturing molded lenses and apparatus useful in manufacturing molded lenses.

BACKGROUND

Molded lenses, such as cast molded contact lenses, for example, hydrogel contact lenses, are produced in cast molding assemblies. Molding assemblies can be understood to be lens molds formed from two mold sections or mold halves. One of the mold sections of the molding assembly has a concave surface that defines an anterior surface of a lens. The other mold section of the molding assembly has a convex surface that defines a posterior surface of the lens. To produce lenses, such as contact lenses, it is necessary to separate the two mold sections (e.g., demold the lens mold), and to release the lens product produced in the molding assembly (e.g., delens the lens product) from one of the mold sections.

Delensing a lens product, for example, a contact lens product, from a mold section may involve placing the mold section, for example, the single mold section to which the lens product is held, on a mandrel. This allows the delensing process, that is the releasing of the lens product from the mold section, to be carried out more effectively, for example, relative to not using a mandrel during the delensing. Once the lens product is released or removed from the single mold section, the mold section is removed from the mandrel and a different mold section with a different lens product is placed on the mandrel and the delensing process is repeated.

The above delensing process can be repeated many times, for example, using different mold sections which are structured substantially exactly the same. That is to say, the mold sections may be structured exactly the same, for example, have exactly the same dimensions and configurations and have surfaces which engage the mandrel, i.e., mandrel engagement surfaces, that are exactly the same.

One issue that arises is that the same delensing system or apparatus is often used to remove lens products from differently structured mold sections, such as mold sections having different dimensions or having different configurations or having different mandrel engagement surfaces or any combination thereof. Because, in order to be effective, the mandrel needs to fixedly retain the mold section during at least a portion of the delensing process, the practice has been to replace the mandrel on the delensing system or apparatus every time a differently structured or differently dimensioned mold section or a mold section having a different mandrel engagement surface needed to be delensed. This mandrel replacement step requires a significant amount of downtime of the delensing system or apparatus. Also, the number of mandrels that need to be available is directly related to the number of different mold sections that need to be processed. The downtime for mandrel replacement and the need for different mandrels add to the cost of manufacturing lenses, for example, contact lenses.

Additionally, even when mold sections having mandrel engagement surfaces having the same dimensions and configurations are used, the tolerances of the dimensions and configurations of the mandrel engagement surfaces must be sufficiently tight to ensure that the mandrel engagement surfaces will engage correctly with a standard mandrel. This requires that both the back surface and the front (molding) surface of an individual mold section be formed within tight tolerances, such that expensive mold tooling be used to form both the front and back surfaces of a mold section, and that mold sections having mandrel engagement surfaces which are not within tolerance, for example, are out of specification, be scrapped. Both using expensive mold tooling and having to scrap mold sections which are not within tolerance increase the cost of lens manufacturing.

There are needs for new methods and apparatus useful to address these and other issues involving the manufacture of lenses, such as contact lenses.

SUMMARY

New methods of manufacturing lenses, such as contact lenses, and apparatus such as mandrels, are disclosed herein which address these and other needs and issues. Although the present methods and apparatus are disclosed herein with regard to the manufacture of molded contact lenses, it is to be understood and appreciated that such methods and apparatus are applicable and useful in manufacturing other molded lenses from lens molds, for example, cast molded lenses and ophthalmic devices, such as intraocular lenses, corneal onlays, corneal inlays and the like.

In one aspect, the present methods of manufacturing a contact lens comprise providing a polymerized contact lens product on a single mold section comprising a mandrel engagement surface; placing the single mold section in contact with an adjustable mandrel; and delensing the polymerized contact lens product from the single mold section to separate the polymerized contact lens product from the single mold section.

In one example, the adjustable mandrel comprises a mold section engagement member such that the mandrel engagement surface of the single mold section and the mold section engagement member of the adjustable mandrel interact to fixedly retain the single mold section on the adjustable mandrel.

In another example, mandrels for carrying a mold section on which is located a contact lens product are provided and comprise an adjustable mold section engagement member effective to interact with a mandrel engagement surface of a single mold section on which is located a polymerized contact lens product to fixedly retain the single mold section on the mandrel.

Providing an adjustable mandrel allows the same mandrel to be used in delensing differently structured and/or differently sized contact lens mold sections, including mold sections having a larger tolerance for the dimensions of their mandrel engagement surfaces. Thus, the adjustable mandrel does not need to be replaced each time a differently sized and/or differently structured mold section is to be delensed, or when the dimensions of the mandrel engagement surfaces vary between lots or between cavities used to injection mold the mold sections.

In addition, the adjustable mandrels of the present disclosure may be easily and/or quickly adjusted to accommodate differently sized and/or differently structured mold sections.

Thus, the present adjustable mandrels and the use thereof, reduce or even substantially eliminate (1) the need for differently sized or differently configured mandrels, (2) the need to ensure the dimensions of the mandrel engagement surfaces of contact lens product mold sections remain within a narrow tolerance between lots of contact lens product mold sections and between cavities used to form the contact lens product mold sections, and (3) delensing system downtime needed to process differently sized and/or differently structured contact lens product mold sections.

Various examples are described in detail in the detailed description and additional disclosure below. Any feature or combination of features described herein are included within the scope of the present disclosure provided that the features included in any such combination are not mutually inconsistent as will be apparent from the context, this specification, and the knowledge of one of ordinary skill in the art. In addition, any feature or combination of features may be specifically excluded from any example of the present disclosure. Additional advantages and examples are apparent in the following detailed description, additional disclosure and drawings in which like parts bear like reference numerals.

In one example, the present disclosure is directed to a method of manufacturing a contact lens comprising:

providing a polymerized contact lens product on a single mold section, the single mold section comprising a mandrel engagement surface;

placing the single mold section in contact with an adjustable mandrel, the adjustable mandrel comprising a mold section engagement member, such that the mandrel engagement surface of the single mold section and the mold section engagement member of the adjustable mandrel interact to fixedly retain the single mold section on the adjustable mandrel; and delensing the contact lens product from the single mold section to separate the contact lens product from the single mold section.

The method of the present disclosure can further comprise adjusting a diameter of the mold section engagement member of the mandrel to facilitate the interaction between the mold section engagement member and the mandrel engagement surface.

The method of the present disclosure can be a method wherein the adjustable mandrel is coupled to a contact lens delensing apparatus.

The method of the present disclosure can be a method which further comprises adjusting the mandrel without decoupling the mandrel from the contact lens delensing apparatus.

The method of the present disclosure can be a method wherein the providing step comprises providing a plurality of contact lens products on a plurality of different sized or different configured mold sections, and the method further comprises adjusting the mandrel without decoupling the mandrel from the contact lens delensing apparatus, the adjusting being done, as needed, to effectively retain the plurality of different sized or different configured mold sections to the mandrel to facilitate releasing the contact lens products from the mold sections.

The method of the present disclosure can be a method which further comprises adjusting the mandrel at a plurality of different locations on the mandrel.

The method of the present disclosure can be a method which further comprises adjusting the mandrel at three different locations on the mandrel.

The method of the present disclosure can be a method wherein the different locations are substantially equally spaced apart from each other.

The method of the present disclosure can be a method wherein the mandrel comprises a plurality of pivotable clutches, and the method comprising adjusting the positions of the plurality of pivotable clutches, thereby adjusting the diameter of the mold section engagement member of the mandrel.

The method of the present disclosure can be a method which further comprises maintaining each of the plurality of pivotable clutches in a fixed position with a set screw.

The method of the present disclosure can be a method which further comprises loosening the set screw and rotating each of the plurality of clutches in adjusting the positions of the plurality of clutches.

The method of the present disclosure can be a method which comprises maintaining each of the plurality of pivotable clutches in a fixed position and rotating each of the plurality of pivotable clutches using a different set screw for each clutch.

The method of the present disclosure can be a method wherein the delensing step includes: (1) rotating the mold section; (2) holding the mold section in a fixed position; (3) squeezing the mold section; (4) applying a compressed gas at a position near an edge of the contact lens carried by the mold section to at least assist in releasing the contact lens from the mold section; or (5) applying a liquid to the contact lens carried by the mold section to at least assist in releasing the contact lens from the mold section, or combinations thereof.

The present disclosure is also directed to a mandrel for carrying a mold section on which is located a contact lens product, the mandrel comprising:

an adjustable mold section engagement member effective to interact with a mandrel engagement surface of a single mold section on which is located a polymerized contact lens product to fixedly retain the single mold section on the mandrel.

The mandrel can be a mandrel wherein the adjustable mold section engagement member is adjustable to effectively fixedly retain a plurality of different sized or different configured mold sections on the mandrel.

The mandrel can be a mandrel wherein the adjustable mold engagement member comprises a central core having a outer diameter; and a plurality of pivotable clutches located relative to the central core so that the size of the outer diameter is adjusted in response to varying the position of each of the plurality of pivotable clutches.

The mandrel can be a mandrel wherein each of the plurality of pivotable clutches includes a gripping portion which is rotatable inwardly or outwardly relative to a central mounting post of the clutch.

The mandrel can be a mandrel wherein each of the plurality of pivotable clutches is coupled to the central core by a set screw to facilitate rotating the gripping portion of the clutch inwardly or outwardly relative to the central mounting post of the clutch and to fix the position of the gripping portion of the clutch at a desired use position.

The mandrel can be a mandrel wherein the central core is substantially cylindrical.

The mandrel can be a mandrel which is coupled to a contact lens delensing apparatus, and the mandrel is structured so that the mold section engagement member is adjustable while the mandrel remains coupled to the apparatus.

The mandrel can be a mandrel wherein the plurality of pivotable clutches are at least two pivotable clutches.

The mandrel can be a mandrel wherein, the plurality of pivotable clutches are three pivotable clutches.

The mandrel can be a mandrel wherein the plurality of pivotable clutches are substantially equally spaced apart from each other.

DETAILED DESCRIPTION

Figure 1:
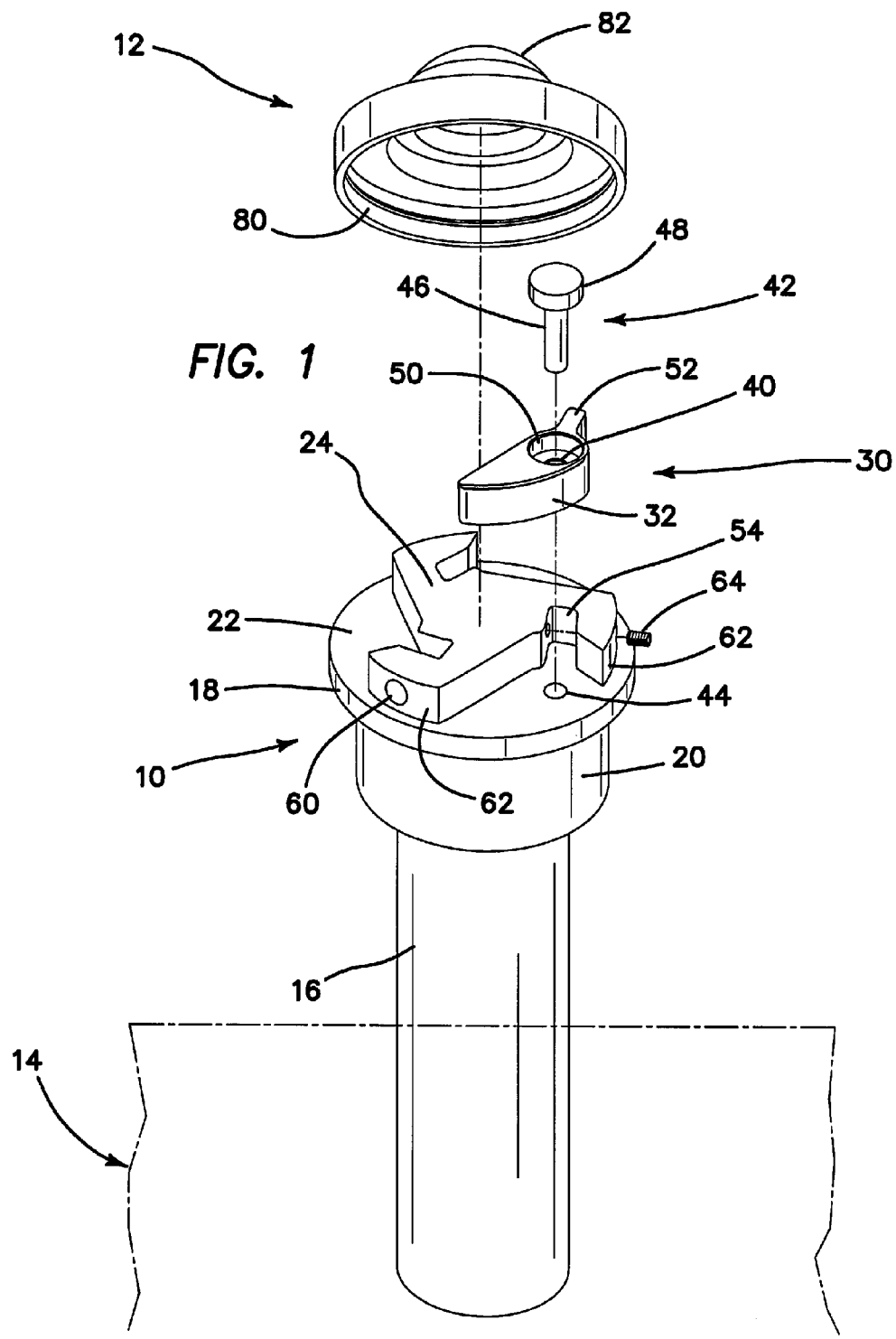
FIG. 1 is a somewhat schematic illustration of a mandrel of the present disclosure including certain of its component parts shown in an exploded manner for ease of description, together with a contact lens mold section.

New methods of manufacturing ophthalmic lenses, such as contact lenses, have been invented.

In a contact lens cast molding procedure a polymerizable lens precursor composition, such as a monomer mixture and the like, can be placed in contact with a contact lens mold section. For example, the polymerizable lens precursor composition can be placed on a concave surface of a first mold section. The concave surface of the first mold section defines the anterior surface of a lens obtained therefrom. The first mold section can be understood to be a female mold section. A second mold section is placed in contact with the first mold member containing the precursor composition to form a lens shaped cavity containing the precursor composition. The second mold section includes a convex surface defining a posterior lens surface defining a posterior lens surface of a lens obtained therefrom. The second mold section can be understood to be a male mold member. As used herein, the combination of the first mold section and the second mold section can be understood to be a contact lens mold assembly.

The contact lens mold assembly containing the polymerizable lens precursor composition, for example, in a lens shaped cavity between the first and second mold sections, is exposed to conditions, such as, for example, heat or ultraviolet (UV) light, effective in curing or polymerizing the polymerizable lens precursor composition. After curing or polymerization, a polymerized contact lens product is formed and is located in the contact lens shaped cavity.

The contact lens mold assembly is then demolded to separate the first and second mold sections from each other. Following demolding, the polymerized contact lens product remains attached to or in with one and only one of the mold sections of the mold assembly used to form it.

After demolding the contact lens mold assembly, the polymerized contact lens product is delensed from the one mold section to which it is attached or to which it is held. After delensing the polymerized contact lens product from the mold section, the contact lens product may undergo a washing or extraction or hydration process to produce a washed contact lens, an extracted contact lens or a hydrated contact lens, respectively. The delensed contact lens product or the washed, extracted or hydrated contact lens can then be inspected, packaged, and sterilized, for example, using conventional methodologies, as understood by persons of ordinary skill in the art.

The present methods and apparatus primarily involve contact lens manufacturing occurring after the contact lens product is formed in the lens-shaped cavity between the first and second mold sections of the mold assembly.

In one example, the present method of manufacturing a contact lens comprises: providing a polymerized contact lens product on a single mold section, the single mold section comprising a mandrel engagement surface; placing the single mold section in contact with an adjustable mandrel, the adjustable mandrel comprising a mold section engagement member, such that the mandrel engagement surface of the single mold section and the mold section engagement member of the adjustable mandrel interact to fixedly retain the single mold section on the adjustable mandrel; and delensing the contact lens product from the single mold section to separate the contact lens product from the single mold section.

The present method may further comprise adjusting a dimension, for example, a diameter periphery and the like, of the mold section engagement member of the adjustable mandrel to facilitate the interaction between the mold section engagement member and the mandrel engagement surface, for example, so that the single mold section can be fixedly retained on the mandrel.

In one example, the adjustable mandrel is coupled to a contact lens delensing apparatus, for example, such an apparatus of conventional design.

In one example, the method further comprises adjusting the mandrel, for example, adjusting the size and/or configuration, such as one or more dimensions, of the mandrel without decoupling the mandrel from the contact lens delensing apparatus.

The present methods may include a providing step which comprises providing a plurality of contact lens products on a plurality of different sized or configured mold sections. The method may comprise adjusting the size and/or configuration of the mandrel, i.e., one or more times, without decoupling the mandrel from the contact lens delensing apparatus, the adjusting being done, as needed, for example, as often as needed, to fixedly or effectively retain the plurality of different sized or configured mold sections to the mandrel to facilitate releasing the contact lens products from the different mold sections.

In one example, the method further comprises adjusting the mandrel at a plurality of different locations on the mandrel, for example, at three different locations on the mandrel. The different locations may be spaced apart, for example, substantially equally spaced apart, from each other.

In one example, the mandrel comprises a plurality of moveable or adjustable clutches, for example, pivotable clutches, and the method comprising adjusting the positions of the plurality of clutches, thereby adjusting the size and/or configuration of the mold section engagement member, for example, a dimension, such as a diameter or a periphery, of the mold section engagement member of the mandrel.

The method may further comprise maintaining each of the plurality of adjustable clutches in a fixed position with a set screw. Each clutch may be maintained in a fixed position with a different set screw. In one example, the method further comprises loosening the set screw or screws and rotating the clutch or each of the plurality of clutches in adjusting the positions of the clutch or clutches. The method may comprise maintaining each of the plurality of clutches in a fixed position and rotating each of the plurality of clutches using a different set screw for each clutch.

In one example, a biasing element, such as a spring or other biasing member, is employed to assist in maintaining the position of the clutch.

The present methods may include a delensing step in which the mold section, with the contact lens product on or carried by, the mold section, is retained on the adjustable mandrel. The delensing step may include at least one of (1) rotating the mold section; (2) holding the mold section in a fixed position; (3) squeezing the mold section; (4) applying a compressed gas at a position near an edge of the contact lens product on or carried by the mold section to at least assist in releasing the contact lens product from the mold section; or (5) applying a liquid to the contact lens product carried by the mold section to at least assist in releasing the contact lens product from the mold section, and any combination of two or more thereof. A number of these delensing steps are conventional and/or known in the art. See, for example, Witko U.S. Pat. Nos. 7,799,248 and 8,197,724, each of which is hereby incorporated in its entirety by reference herein.

A mandrel for carrying a mold section on which is located a contact lens product is provided. The mandrel may comprise an adjustable mold section engagement member effective to interact with a mandrel engagement surface of a single mold section on which is located a polymerized contact lens product to fixedly retain the single mold section on the mandrel.

In one example, the adjustable mold section engagement member is adjustable to effectively fixedly retain a plurality of different sized and/or configured mold sections on the mandrel.

The adjustable mold section engagement member of the mandrel may comprise a central core having an outer dimension, for example an outer diameter or an outer periphery, and a plurality of moveable or adjustable clutches, for example, pivotable clutches, located relative to the central core so that the size and/or configuration of the adjustable mold engagement member, for example, of the central core, such as an outer dimension, for example, the outer diameter or outer periphery of the central core, is adjusted in response to varying the position of one or more of the plurality of clutches, for example, each of the plurality of clutches.

In one example, each of the plurality of clutches includes a gripping portion which is rotatable inwardly or outwardly relative to a central mounting post of the clutch.

In one example, each of the plurality of clutches is coupled to the mandrel by a set screw to facilitate rotating the gripping portion of the clutch inwardly or outwardly relative to the central mounting post of the clutch and to fix the position of the gripping portion of the clutch at a desired use position. A spring, or other biasing member, may be provided to provide an effective counter force to assist in maintaining, the clutch in the desired use position.

The central core may be substantially cylindrical in shape.

The mandrel may be coupled to a contact lens delensing apparatus, and the mandrel may be structured so that the mold section engagement member is adjustable while the mandrel remains coupled to the delensing apparatus.

The plurality of clutches may be at least two clutches, for example, three or more clutches. In one example, the plurality of clutches are substantially equally spaced apart, for example, as shown in the drawings.

DESCRIPTION OF THE DRAWINGS

Referring now to FIG. 1, a partially exploded view, in perspective, of a mandrel 10 in accordance with the present disclosure is shown. In addition, in FIG. 1, a contact lens mold section 12 is shown, and a schematic illustration of a delensing system 14, for example, of conventional design, to which the mandrel is coupled, is shown in shadow lines.

The mandrel 10 includes an elongated stem 16 which is coupled to the delensing system 14. A relatively wide or large top platform 18 is provided, and an intermediate portion 20 is located between stem 16 and top platform 18.

A central core 24 is carried on top surface 22 of top platform 18. The elongated stem 16, intermediate portion 20, top platform 18 and central core 24 can be assembled together from individual parts or can be produced, e.g., molded, as a single unitary piece.

As shown in FIG. 1, a single pivotable clutch 30 is shown. However, with reference to FIG. 2, mandrel 10 includes three (3) pivotable clutches 30, at different locations, equally spaced apart from each other at locations on the top surface 22.

Figure 2:
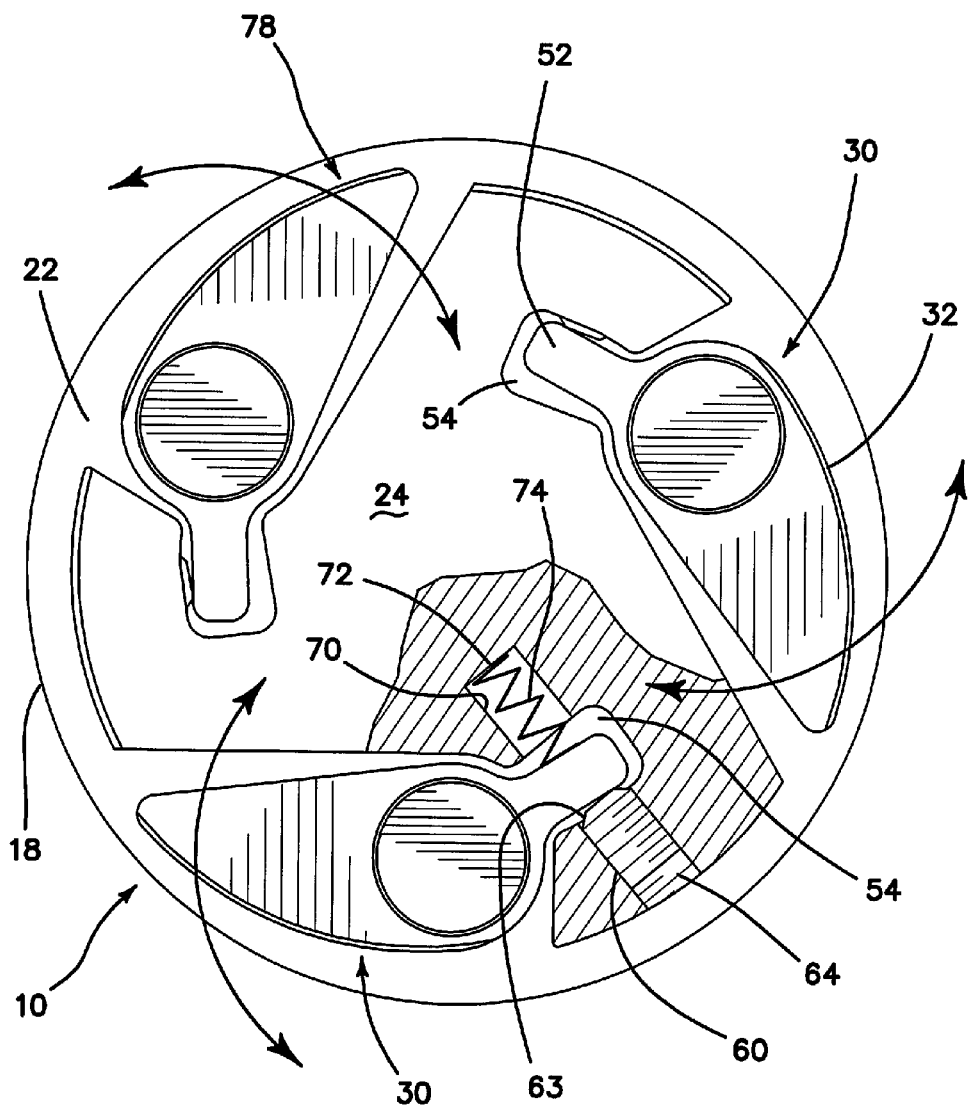
FIG. 2 is a top view, partially in cross-section of the mandrel shown in FIG. 1.

In the example illustrated in FIG. 2, each of the clutches 30 is constructed similarly and is secured to the remaining components of the mandrel 10 similarly. Such construction and securement is described with reference to the clutch 30 shown in FIG. 1.

In the examples illustrated in FIGS. 1 and 2, each of the clutches 30 includes a curved gripping surface 32. Such gripping surface 32 may be structured, for example, roughened, textured or otherwise provided with a quality; to provide a surface which is a more effective gripping surface relative to a smooth surface. Each of the gripping surfaces 32 is rotatable, along with the rest of clutch 30, and intrudes into or forms a part of the outside periphery of the central core 24.

The central core 24 is configured to allow the desired amount of rotation of the clutches 30.

As shown with regard to clutch 30 in FIG. 1, each of the clutches 30 includes a through opening 40. A central mounting post 42 is passed into through opening 40 and into top opening in top platform 18. Central mounting post 42 includes an elongated post member 46 which extends into top opening 44 and an enlarged top portion 48 which fits into enlarged opening 50 in clutch 30.

With central mounting post 42 in place, as noted above, clutch 30, and in particular gripping surface 32 of clutch 30, can be rotated, relative to central mounting post 42, inwardly toward the center of core 24 and outwardly away from the core 24, for example, as shown in FIG. 2.

During use of mandrel 10, the positions of each of the clutches 30, and in particular gripping surface 32 of clutch 30, are to be fixed. To provide such fixed position, each of the clutches 30 include a rearward extending projection 52, which is placed in an enlarged recess 54 in the central core 24. The recess 54 is sized to allow some movement or rotation of the projection 52 in the recess, for example, toward the center of the core 24 and away from the center of the core 24.

A threaded through hole 60 is provided in the central core between the outer surface 62 of the central core and the outer surface 63 (see FIG. 2) of the recess 54. A properly sized set screw 64 is positioned in the threaded through hole 60 and comes in contact with the projection 52 of clutch 30.

With reference to FIG. 2, central core 24 includes a closed ended bore 70, which extends from recess 54 inwardly (toward the center of) into the central core 24. Bore 70 terminates at back wall 72.

A spring member 74 is fitted into bore 70, is in contact with back wall 72 and extends into recess 54 where it contacts projection 52 of clutch 30. Spring member 74 provides a sufficient amount of biasing or counter force so that the rotational position of the clutch 30 can be determined and fixed by the position of set screw 64.

Mandrel 10 provides an adjustable mold section engagement member, shown generally at 78 in FIG. 2. Mold section engagement member 78 is a combination of the three adjustable clutches 30, each of which has a gripping surface 32 which actually comes into contact with the mandrel engagement surface 80 of the mold section 12. For example, the gripping surfaces may be considered to comprise the mold section engagement member 78. In the example illustrated in FIG. 2, the central core 24, for example, the outer surface 62 of central core 24, may also be considered as being part of the mold section engagement member 78.

Thus, by adjusting the position of the set screw 64, one can fix the position, in particular the rotational position, of clutch 30, and in particular of the gripping surface 32. For example, by threading (passing) the set screw into threaded hole 60 so that the set screw extends relatively far into recess 54, the gripping surface 32 of clutch 30 is caused to rotate outwardly relative to the center of central core 24. This adjustment allows mandrel 10 to be useful in holding or carrying relatively larger contact lens mold sections.

Conversely, by threading (passing) the set screw 64 so that the set screw extends a relatively small distance into recess 54, the gripping surface 32 of clutch 30 is caused to rotate inwardly relative to the center of central core 24. This adjustment allows mandrel 10 to be useful holding or carrying relatively smaller contact lens mold sections.

Mandrel 10, and many of its component parts, may be made of any suitable material or materials of construction. Examples include, without limitation, metals, glasses, polymers (thermoplastic and/or thermosetting), and the like and any combination thereof. Mandrel 10 may be constructed of a material or a combination of materials so as to not damage or destroy the mold section or the contact lens being carried by the mold section.

The Mandrel 10 may be used as follows.

The mandrel 10 is coupled to a delensing system 14, for example, using conventional and well known mandrel/delensing system coupling procedures. Such coupling may depend on the particular delensing system being used. Mandrel 10, for example, stem 16, may have particular structural features to facilitate coupling the mandrel to the delensing system being used.

Once mandrel 10 is coupled to the delensing system 14, the size of mold section engagement member 78 of the mandrel is checked to confirm that it is acceptable (compatible) with the contact lens mold sections such as contact lens mold section 12, to be delensed. If necessary, the size of the mold section engagement member 78 of the mandrel is adjusted, by adjusting the position of the set screws 64, as discussed above, so that the mandrel engagement surface 80 of the mold sections 12 to be delensed and mold section engagement member of the mandrel are compatibly sized, so that the mold section engagement member 78 of mandrel 10 interacts to fixedly retain the mold section 12 on the mandrel without damaging or destroying the mold section or the contact lens product 82 being carried by the mold section.

Once such compatibility is obtained, mandrel 10 is used in a method to delens the mold section. With mandrel 10 so adjusted and configured, the mandrel can be used in delensing a plurality of similarly sized and structured mold section's.

After a period of time, different sized/configured mold sections need to be delensed.

At this time, without decoupling mandrel 10 from the delensing system 14, the mold section engagement member 78 of the mandrel 10 is adjusted, as described elsewhere herein, by adjusting the position of set screws so that the mandrel 10 is useable in delensing the different sized/configured mold sections.

After such adjustment, mandrel 10 is used successfully to delens the different sized/configured mold sections.

This method can continue and be repeated to delens many different sized/configured mold sections very conveniently and efficiently, without decoupling the mandrel from the delensing system and without damaging the mold sections or the contact lens products. Thus, the present adjustable mandrels and methods using such adjustable mandrels provide contact lens production efficacies, for example, by reducing/eliminating delensing system downtime while providing effective delensing system operation.

In addition, the present adjustable mandrels and methods using adjustable mandrels are useful with a wide variety of delensing systems. For example, and without limitation, the present mandrels and methods are useful with delensing systems in which the delensing step includes: (1) rotating the mold section (2) holding the mold section in a fixed position; (3) squeezing the mold section; (4) applying a compressed gas at a position near an edge of the contact lens carried by the mold section to at least assist in releasing the contact lens from the mold section; or (5) applying a liquid to the contact lens carried by the mold section to at least assist in releasing the contact lens from the mold section, or any combination thereof. Many of these and other delensing systems are conventional and/or well known in the art. Therefore, detailed descriptions of such delensing systems are not presented herein.

Included among these patents and patent publications are U.S. Pat. Nos. 7,320,587; 7,780,881; 7,731,873; 7,785,092; U.S. Patent Publication 2007-0035049; U.S. Pat. Nos. 8,298,458; 7,319,133; 7,426,993; 7,360,890; 7,750,079; 7,799,249.

A number of publications and patents have been cited and/or referred to herein. Each of the cited publications and patents are hereby incorporated by reference in their entireties.

While this the methods and apparatus disclosed herein have been described with respect to various specific examples and illustrations, it is understood that the methods and apparatus are not limited thereto and can be variously practiced within the scope of the following claims.

What is claimed is:

1. A method of manufacturing a contact lens comprising:
   providing a polymerized contact lens product on a single mold section, the single mold section comprising a mandrel engagement surface;
   placing the single mold section in contact with an adjustable mandrel, the adjustable mandrel comprising a plurality of pivotable clutches and a mold section engagement member;
   adjusting the positions of the plurality of pivotable clutches, thereby adjusting the diameter of the mold section engagement member of the mandrel such that the mandrel engagement surface of the single mold section and the mold section engagement member of the adjustable mandrel interact to fixedly retain the single mold section on the adjustable mandrel; and
   delensing the contact lens product from the single mold section to separate the contact lens product from the single mold section.

2. The method of claim 1, wherein the adjustable mandrel is coupled to a contact lens delensing apparatus.

3. The method of claim 2, which further comprises adjusting the mandrel without decoupling the mandrel from the contact lens delensing apparatus.

4. The method of claim 2, wherein the providing step comprises providing a plurality of contact lens products on a plurality of different sized or different configured mold sections, and the method further comprises adjusting the mandrel without decoupling the mandrel from the contact lens delensing apparatus, the adjusting being done, as needed, to effectively retain the plurality of different sized or different configured mold sections to the mandrel to facilitate releasing the contact lens products from the mold sections.

5. The method of claim 1, which further comprises adjusting the mandrel at a plurality of different locations on the mandrel.

6. The method of claim 5, wherein the different locations are substantially equally spaced apart from each other.

7. The method of claim 1, which further comprises maintaining each of the plurality of pivotable clutches in a fixed position with a set screw.

8. The method of claim 7, which further comprises loosening the set screw and rotating each of the plurality of clutches in adjusting the positions of the plurality of clutches.

9. The method of claim 8, which comprises maintaining each of the plurality of pivotable clutches in a fixed position and rotating each of the plurality of pivotable clutches using a different set screw for each clutch.

10. The method of claim 1, wherein the delensing step includes: (1) rotating the mold section; or (2) holding the mold section in a fixed position; or (3) squeezing the mold section; or (4) applying a compressed gas at a position near an edge of the contact lens carried by the mold section to at least assist in releasing the contact lens from the mold section; or (5) applying a liquid to the contact lens carried by the mold section to at least assist in releasing the contact lens from the mold section, or any combination of two or more thereof.

11. A mandrel for carrying a mold section on which is located a contact lens product, the mandrel comprising:

an adjustable mold section engagement member effective to interact with a mandrel engagement surface of a single mold section on which is located a polymerized contact lens product to fixedly retain the single mold section on the mandrel;

wherein the adjustable mold section engagement member is adjustable to effectively fixedly retain a plurality of different sized or different configured mold sections on the mandrel; and wherein the adjustable mold engagement member comprises a central core having an outer diameter; and a plurality of pivotable clutches located relative to the central core so that the size of the outer diameter is adjusted in response to varying the position of each of the plurality of pivotable clutches.

12. The mandrel of claim 11, wherein each of the plurality of pivotable clutches includes a gripping portion which is rotatable inwardly or outwardly relative to a central mounting post of the clutch.

13. The mandrel of claim 12, wherein each of the plurality of pivotable clutches is coupled to the central core by a set screw to facilitate rotating the gripping portion of the clutch inwardly or outwardly relative to the central mounting post of the clutch and to fix the position of the gripping portion of the clutch at a desired use position.

14. The mandrel of claim 11, wherein the plurality of pivotable clutches are at least two pivotable clutches.

15. The mandrel of claim 11, wherein the plurality of pivotable clutches are substantially equally spaced apart from each other.

16. The mandrel of claim 11, which is coupled to a contact lens delensing apparatus, and the mandrel is structured so that the mold section engagement member is adjustable while the mandrel remains coupled to the apparatus.

* * * * *